US006925386B2

(12) United States Patent
Pramik et al.

(10) Patent No.: US 6,925,386 B2
(45) Date of Patent: Aug. 2, 2005

(54) ILLUMINATION MONITORING PROCESS FOR MAKING INFILL DECISIONS

(75) Inventors: William B. Pramik, Katy, TX (US); Aloke K. Mathur, Houston, TX (US); Steven B. Campbell, Houston, TX (US); Andrew F. Lubrano, Sugar Land, TX (US); Sverre L. Strandenes, Stabekk (NO); Andrew Samuel Long, South Perth (AU); Christian Strand, Oslo (NO); Barbara Janina Danielsen, Langhus (NO); Jostein Lima, Oslo (NO)

(73) Assignee: PGS Americas, Inc., Houston, TX (US)

( * ) Notice: Subject to any disclaimer, the term of this patent is extended or adjusted under 35 U.S.C. 154(b) by 17 days.

(21) Appl. No.: 10/662,106

(22) Filed: Sep. 12, 2003

(65) Prior Publication Data

US 2005/0060097 A1 Mar. 17, 2005

(51) Int. Cl.$^7$ ................................................. G01V 1/28
(52) U.S. Cl. ......................................................... 702/14
(58) Field of Search ......................... 702/14, 18; 367/73

(56) References Cited

U.S. PATENT DOCUMENTS 6,182,014 B1 * 1/2001 Kenyon et al. ............... 702/14
6,560,565 B2    5/2003 Roy et al.
6,763,305 B2 * 7/2004 Bernitsas ....................... 702/14

FOREIGN PATENT DOCUMENTS

WO    WO 01/59483    8/2001

OTHER PUBLICATIONS

Lima, Jostein., "Using VR tools to quality control seismic acquisition surveys", Offshore, Aug., 2000, p. 136.
Steve Campbell, Bill Pramik, Bill Cafarelli, "Comparative ray–based illumination analysis", SEG International Exposition and 72$^{nd}$ Annual Meeting, Oct. 2002, four pages.

\* cited by examiner

Primary Examiner—Donald McElheny, Jr.
(74) Attorney, Agent, or Firm—E. Eugene Thigpen; Charles R. Schweppe

(57) ABSTRACT

In a seismic survey, idealized subsurface illumination is generated using idealized survey data. Then, the following three steps are performed during each of a sequence of time intervals during the seismic survey. First, an incremental portion of actual survey data is collected, using data acquisition equipment at a data acquisition location. Second, the incremental portion of actual survey data is communicated from the data acquisition location to a data processing location. Third, an incremental portion of actual subsurface illumination is generated using the incremental portions of actual survey data, to incrementally generate actual subsurface illumination at the data processing location. It is determined if additional data acquisition is desirable by comparison of the idealized subsurface illumination and the actual subsurface illumination, in the data processing location. Then, any desirable additional data acquisition is performed in the data acquisition location before the data acquisition equipment leaves the data acquisition location.

17 Claims, 4 Drawing Sheets

ILLUMINATION MONITORING PROCESS FOR MAKING INFILL DECISIONS

CROSS-REFERENCES TO RELATED APPLICATIONS

Not Applicable

FEDERALLY SPONSOR RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of seismic data acquisition. Specifically, the invention is a method for 3D seismic acquisition, using near real time illumination monitoring.

2. Description of the Related Art

Seismic surveying is a method for determining structures of rock formations below the earth's surface. Seismic surveys are performed by generating seismic signals at source locations and receiving the resulting seismic signals at receiver locations. The seismic signal emanates from the source, and spreads outwardly in a substantially spherical pattern. When the signal reaches interfaces in the subsurface between strata having different acoustic velocities or different acoustic impedances, a portion of the energy will be reflected from the interface, and a portion of the energy will be transmitted through the interface. For the reflected energy, the ray path follows the rule that the angle of incidence is equal to the angle of reflection. The ray path of the energy traveling through the interface will be altered according to Snell's Law.

If the earth's surface and all reflecting interfaces in the subsurface are substantially flat and parallel to the earth's surface, then for seismic signals generated at a given source location and detected at a given receiver location, it can be assumed that the reflection locations will be directly below the mid-point between the source location and the receiver location. Accordingly, if seismic signals are generated at an evenly spaced pattern of source locations, such as a rectangular grid of locations having uniform spacing of the source locations in both the in-line and cross-line directions and if the receiver locations are also evenly spaced, then the locations at which the resulting seismic signals are reflected from a given subsurface reflecting interface will also be evenly spaced, and the reflecting interface will be uniformly illuminated. As used here, the term "illumination" refers to the quantity of signals reflected from a designated area of a subsurface reflecting interface and detected by the receivers.

Frequently, subsurface structures that are of interest are neither parallel to the earth's surface nor flat. Because of the irregularities in the structure of this body, the seismic ray paths emanating from the surface seismic sources that travel to this body and are then reflected to the earth's surface will reach the earth's surface in a very irregular pattern, so that the signals received by the receivers positioned in a standard regular grid pattern as described above represent an illumination of the body which has substantial variation from one part of the structure to another. For areas of low illumination, the fold may be inadequate to map such locations satisfactorily. As used here, the term "fold" refers to the number of received seismic data traces representative of the areas of illumination.

Roy, J. et al., U.S. Pat. No. 6,560,565 B2, "Satellite-Based Seismic Mobile Information and Control System", issued May 6, 2003, discloses a real time data gathering, quality control, and information distribution system, comprising field resources, satellite resources, and office resources that are located at a different site from the field. The seismic system uses positional data determined by GPS (Global Positioning System) integrated with IMU (Inertial Measuring Unit) to determine in near real time whether the determined set of coordinates of a location in the field is within specification relative to quality control parameters and with respect to a set of pre-plot coordinates. A mobile unit determines its coordinates and sends them along with quality control parameters via satellite communications and the Internet to the information and control center in the office resources, where a knowledge base containing facts and expert rules is used to determine if the actual coordinates are sufficiently close to the pre-plot coordinates given the associated quality control parameters. If a mismatch has occurred, a solution is initially and automatically formulated using the knowledge base, and then reviewed and approved by human experts at the control center. A final decision is then transmitted to the mobile unit in the field resources, via satellite communications and the Internet, before the field crew leaves the site. All of the information and actions are shared with the appropriate personnel within the group carrying out the work, as well as with the client and their quality control subcontractors, over the Internet. Accordingly, personnel in the field can reposition the equipment while they are still at the site of the equipment. However, Roy et al. do not correct for the illumination coverage of the target horizons.

Traditional methods for determining if a 3D (three-dimensional) seismic survey has achieved adequate coverage for data quality purposes has been CMP (common midpoint) multiplicity or fold analysis. This analysis calculates the locations of the midpoints and offsets between every source and receiver combination throughout the survey area. These computations are typically segmented into offset ranges and then displayed graphically. If the number of source and receiver combinations that fall into any grid location or bin in the survey falls below certain criteria, infill data acquisition is indicated. This methodology calculates the coverage of the 3D acquisition from the perspective of obtaining uniform surface distributions of reflection points and offsets over the survey area. This method of fold analysis has proven useful, but may not provide an adequate picture of the subsurface illumination in a situation of complicated geology.

It has long been known that there is insufficient resemblance between the coverage of 3D acquisition based on surface calculations, as described in the prior art, when compared to the seismic illumination at a prospective target horizon. A useful tool that can be used in conjunction with the surface coverage calculations is a calculation of the ray trace illumination coverage at the target horizon (or several target horizons). Ray trace illumination modeling has been used for the design of 3D acquisition parameters and for the analysis of 3D seismic illumination after the acquisition phase is complete. Tools and methods exist that can model the predicted illumination at a target horizon based on idealized acquisition parameters, or to analyze the coverage achieved based on navigation and location data recorded during the acquisition phase of a survey. Ray tracing through an earth model can produce a more accurate estimation of subsurface fold coverage and provide a basis for comparison of candidate geometries.

Campbell, S. B. et al., "Comparative ray-based illumination analysis", Soc. of Exp. Geophys., Int'l. Exp. and 72$^{nd}$ Ann. Mtg., Salt Lake City, Utah, Oct. 6–11, 2002, Exp. Abstracts, pp. 41–44 discloses a method for targeting illumination with a model-based, ray-tracing scheme. This method is described further in U.S. patent application Ser. No. 10/155,158, Campbell, Steven B., "Targeted Geophysical Survey", filed May 24, 2002 by a co-inventor of the present application and assigned to the assignee of the present application. Ray tracing is applied to a target area containing hypothetical source and receiver arrays in dense patterns. Emergent points are collected for all contributing sources and plotted as if they were source/receiver midpoints in a fold diagram. The diagram shows areas of high emergent fold for the receivers, revealing the most efficient placement of receivers. Ray tracing may be applied again with only the high emergent receiver locations and the hypothetical dense array of sources. Departure points are now binned as source/receiver midpoints and areas of high departure fold reveal the most efficient placement of sources. However, Campbell et al. do not discuss how to correct for the illumination coverage of the target horizons in real or near real time.

Ray trace illumination modeling from actual navigation data is a better approximation of the degree to which a subsurface target horizon has been illuminated than conventional surface-based common midpoint coverage analysis. However, to be of any use in the planning and execution of infill acquisition, the results of the ray trace illumination modeling needs to be available in real time. The ray trace illumination results must be available almost immediately at the completion of acquisition of the data, or better still, while the acquisition of the seismic data is still in progress. Recent advances in the speed at which data can be transferred and improvements in computational abilities have made this possible.

Therefore, a need exists for a method to provide an improved data set that can be used in the analysis of infill decisions during the course of a 3D seismic acquisition project. Thus, a need exists for a method for monitoring the illumination of 3D seismic acquisition in near real time. A need exists for a methodology for acquiring and then analyzing subsurface illumination modeling results, determining and applying the preferred location of infill acquisition, and predicting and evaluating the results of the infill acquisition, all in near real time.

BRIEF SUMMARY OF THE INVENTION

The invention is a method for 3D seismic acquisition, using near real time illumination monitoring. Idealized subsurface illumination is generated using idealized survey data. Then, the following three steps are performed during each of a sequence of time intervals during the seismic survey. First, an incremental portion of actual survey data is collected, using data acquisition equipment at a data acquisition location. Second, the incremental portion of actual survey data is communicated from the data acquisition location to a data processing location. Third, an incremental portion of actual subsurface illumination is generated using the incremental portions of actual survey data, to incrementally generate actual subsurface illumination at the data processing location. It is determined if additional data acquisition is desirable by comparison of the idealized subsurface illumination and the actual subsurface illumination, in the data processing location. Then, any desirable additional data acquisition is performed in the data acquisition location before the data acquisition equipment leaves the data acquisition location.

BRIEF DESCRIPTION OF THE DRAWINGS

The invention and its advantages may be more easily understood by reference to the following detailed description and the attached drawings, in which.

Figure 1:
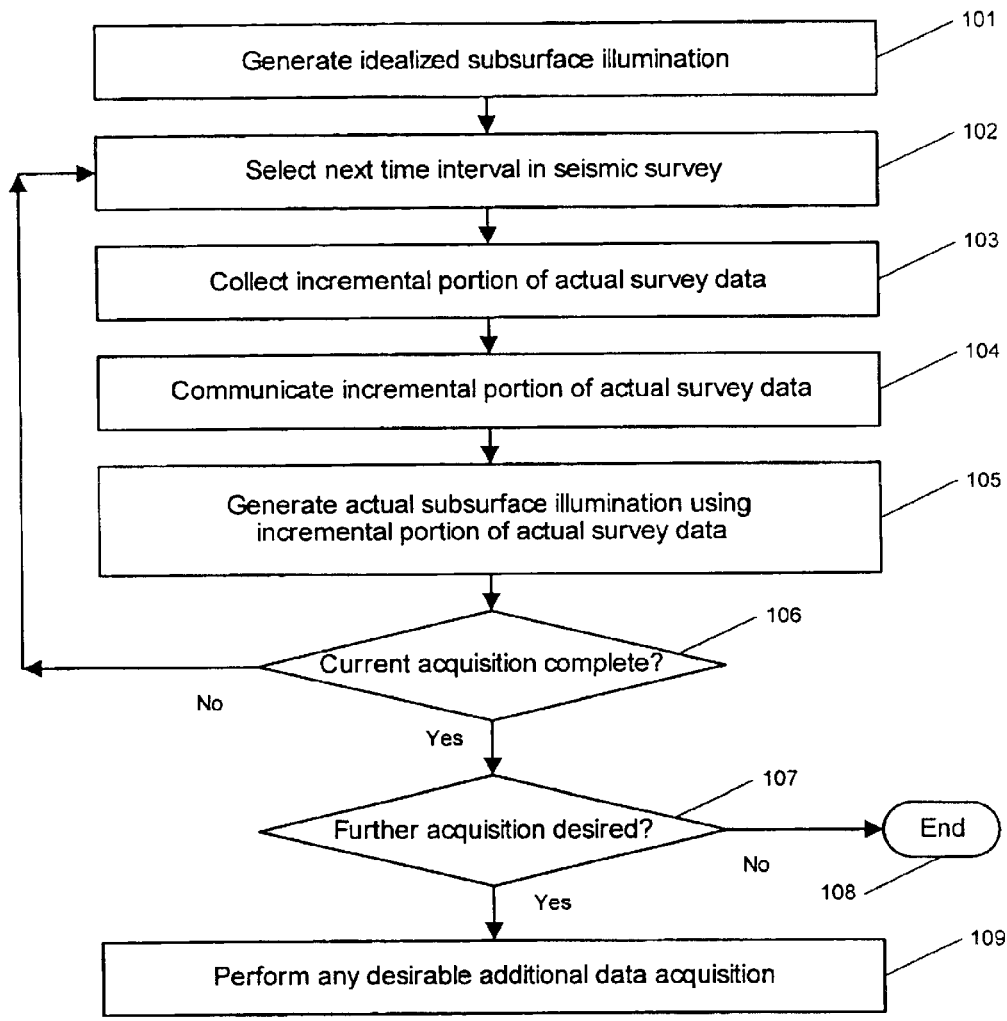
FIG. 1 is a flowchart illustrating the processing steps of an embodiment of the method of the invention for 3D seismic acquisition, using near real time illumination monitoring.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for 3D seismic acquisition, using near real time illumination monitoring. The invention aids in making the infill acquisition decision process possible in near real time during a seismic survey. Previously, the time lag between collecting the seismic data and processing the seismic data has prevented making a decision regarding the need for additional seismic acquisition in near real time. Further, the time required to transmit the large amounts of seismic data from the location where the data is collected to the location where the data is processed adds to the time lag. Seismic data processing is still an endeavor that uses the largest computers available, so such computers are typically located at central processing facilities rather than at seismic acquisition field sites.

Now, however, improvements in computer technology have greatly increased the speed of processing the seismic data. Additionally, improvements in data transmission via satellite, typically the only communication means available from remote or marine seismic acquisition sites, have greatly increased the speed of seismic data communication. Nonetheless, communicating and processing the immense amount of seismic data acquired in a typical 3D seismic survey all at once would still take too long to be able to make infill acquisition decisions in near real time. For practical and economic reasons, "near real time" is defined as before the seismic acquisition equipment and accompanying personnel leave the seismic acquisition location to go to another job. The present invention solves this time problem by speeding up both the data communication and processing steps to speeds matching the data collecting step. The present invention does so by communicating and processing the data incrementally as the data is collected. Incremental portions of seismic data can be communicated and processed as quickly as it is collected, and then incrementally appended to previously processed data to finally generate a complete processed data set. Thus, as the data collection is completed, only the last incremental portion of data remains to be communicated and processed before having the complete processed data available for the analysis needed to make decisions about additional acquisition.

In the method of the invention, idealized subsurface illumination is generated, before or during the seismic survey, as a baseline view of the predicted subsurface coverage. Idealized subsurface illumination is preferably generated by applying ray trace illumination modeling to idealized survey data. Idealized survey data has seismic sources and receivers located in idealized configurations, such as on an evenly spaced grid of straight lines. Actual subsurface illumination is generated incrementally during the seismic acquisition phase of the seismic survey. The actual subsurface illumination is preferably generated by applying ray trace illumination modeling to the actual survey data, the actual locations of the seismic sources and receivers during seismic acquisition. The actual survey data is incrementally collected in the data acquisition location, incrementally communicated from the data acquisition location to the data processing location, and incrementally processed at the data processing location. During or at the completion of the initial phase of seismic acquisition, the baseline idealized subsurface illumination and the actual subsurface illumination are compared with each other and with surface-based CMP coverage displays. Areas are identified where the surface-based CMP coverage displays show complete coverage, but where the subsurface illumination results show deficient subsurface coverage. Targeted illumination analysis is preferably applied to determine if and how these areas may be better illuminated. Infill acquisition decisions based on these comparison analyses are then completed in time to communicate the resulting directives to the field before the seismic equipment and accompanying personnel leave the survey area.

Further, any decisions relative to infill acquisition or additional acquisition should be ray trace illumination modeled using ideal acquisition geometry and idealized survey data to provide a prediction of the coverage that will be generated by the infill acquisition. Following the additional acquisition, the resulting survey data should be used to model the achieved coverage. Comparisons between the predicted and achieved coverage are made in the same manner as described above.

FIG. 1 is a flowchart illustrating the processing steps of an embodiment of the method of the invention for 3D seismic acquisition, using near real time illumination monitoring. The flowchart in FIG. 1 provides an overview of the method of the invention. Further details of the method of the invention are described with reference to the flowcharts in FIGS. 2–6. The invention is applicable to any type of seismic survey, but will be illustrated with reference to marine seismic surveys using towed streamers.

At step 101, idealized subsurface illumination is generated using idealized survey data. The preferred method for generating idealized subsurface illumination is ray trace illumination modeling, applied using idealized source and receiver locations in a data acquisition location. This preferred method is described further in the discussion with reference to the flowchart in FIG. 2, below.

At step 102, a time interval is selected during a seismic survey. Preferably, a sequence of time intervals are preselected in a systematic manner for the current cycle of the seismic survey. At the beginning, the current cycle is the initial seismic survey as planned. If any additional infill acquisition is determined to be needed, then the current cycle is the additional infill acquisition. The sequence of time intervals are preferably selected at regularly scheduled convenient stopping points in the seismic survey, starting at the onset of actual data acquisition in the field and continuing until the end of field acquisition. For example, in the case of marine seismic surveys, the sequence of time intervals would typically be selected as comprising each sail line of the seismic survey. However, there is enough flexibility in the method of the invention to adjust the time intervals for unforeseen occurrences, such as equipment failure or bad weather, in the seismic survey.

At step 103, an incremental portion of actual survey data is collected in the time interval selected in step 102. The incremental data collection uses data acquisition equipment, and its accompanying personnel, at a data acquisition location. The actual survey data comprises coordinate data for the actual seismic source and receiver locations in the ongoing seismic survey.

By way of example, but not of limitation, consider the case of marine seismic surveying. As a vessel is acquiring seismic data, location information is obtained from the various positioning systems onboard the vessel. These systems include, but are not limited to, the main navigational GPS receivers, supplementary GPS receivers at the seismic sources and, in some cases, the tail buoys, and the underwater acoustic positioning system that operates between the hull of the vessel, the source arrays, and the entire length of each streamer, which carry the seismic receivers. This location information is converted into the locations of the sources and receivers, which is captured, processed, refined, and typically output in standard SEG (Society of Exploration Geophysicists) P1-90 format.

At step 104, the incremental portion of actual survey data collected in step 103 is communicated from the data acquisition location to a data processing location. This communication takes place during the time interval selected in step 102. The step of communicating an incremental portion of actual survey data is further described below with reference to the flowchart in FIG. 3.

At step 105, an incremental portion of actual subsurface illumination is generated using the incremental portions of actual survey data collected in step 103 and communicated in step 104. This generation takes place at the data processing location, during the time interval selected in step 102. This incremental generation by portions, when completed by cycling through steps 102 to 106, will generate the actual subsurface illumination in its entirety. The preferred method for generating actual subsurface illumination is ray trace illumination modeling, applied using the incremental portion of actual survey data. This preferred method is described further in the discussion with reference to the flowchart in FIG. 4, below.

At step 106, it is determined if the current cycle of seismic surveying is complete. If the answer is no, the current cycle of seismic surveying is not complete, then the process returns to step 102 to select another time interval and collect more seismic data. If the answer is yes, the current cycle of seismic surveying is complete, then the process continues to step 107.

At step 107, it is determined if additional data acquisition is desirable after the current cycle of data acquisition is completed in steps 102 through 106. The determination is made by comparison of the idealized subsurface illumination generated in step 101 and the actual subsurface illumination generated incrementally in step 105. The determination is made in the data processing location. If the answer is no, no additional data acquisition is desirable, then the process proceeds to step 108 to end. If the answer is yes, additional data acquisition is desirable, then the process continues to step 109. The step of determining if additional data acquisition is desirable is further described below with reference to the flowchart in FIG. 5.

At step 109, any additional data acquisition that is determined in step 107 to be desirable is performed. The additional data acquisition is performed in the data acquisition location, so the decision and instructions must be transmitted from the data processing location back to the data acquisition location before the data acquisition equipment, and its accompanying personnel, leave the data acquisition location. The step of performing any desirable additional data acquisition is further described below with reference to the flowchart in FIG. 6.

Figure 2:
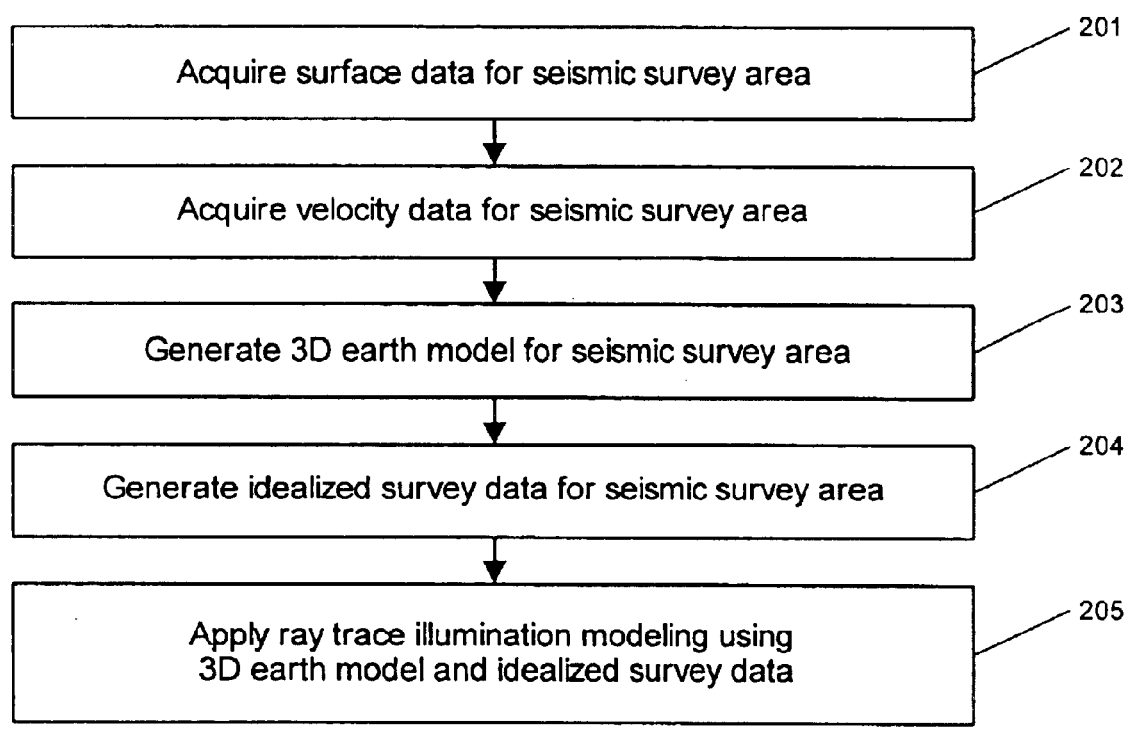
FIG. 2 is a flowchart describing further the step of generating idealized subsurface illumination, from FIG. 1.

FIG. 2 is a flowchart describing further the step of generating idealized subsurface illumination, as discussed above with reference to step 101 in FIG. 1.

At step 201, surface data is acquired for the seismic survey area of interest. The surface data comprises three-dimensional coordinates giving the location of all surfaces of interest. The surface data may include, but is not restricted to, the earth's surface, water surface, water bottom surface, target horizons of interest, salt dome boundaries, and faults.

The three-dimensional coordinates used in this and further steps are typically standard Cartesian coordinates, with x and y giving the horizontal, or lateral location, coordinates and z giving the vertical, or depth, coordinate. Often the x and y coordinates are chosen to correspond to the in-line and cross-line coordinates, respectively, of the seismic survey. Alternatively, the x and y coordinates correspond to real world coordinates, such as UTM (Universal Transverse Mercator) coordinates, as used on U.S. Geological Survey maps. In either case, the coordinates may have to be transformed to and from internal coordinates used in computer software programs in the processing steps discussed below.

At step 202, velocity data is acquired for the seismic survey area of interest. The velocity data is preferably acquired in the form of a velocity cube, a three-dimensional grid of coordinate points and velocity values. The surface data in step 201 and the velocity data earth model can be generated from any appropriate data sources. By way of example, but not of limitation, the surface and velocity data may be generated from combinations of such sources as well log data, gravity data, magnetic data, and seismic data.

At step 203, a 3D earth model is generated for the seismic survey area of interest. The earth model is generated from the surface data acquired in step 201 and the velocity data acquired in step 202. The model is generated to provide a reasonable approximation to the geologic structure in the seismic survey area.

At step 204, idealized survey data for the seismic survey is generated. The idealized survey data comprises coordinate data for seismic source and receiver locations in an idealized pre-plot survey. Typically, the idealized pre-plot survey has idealized acquisition geometry with the sources and receivers positioned in a regular grid constructed of straight lines and uniform spacing.

By way of example, but not of limitation, the idealized survey data in the case of marine seismic surveys includes perfect navigation data and perfect vessel configuration data. Perfect data means perfect shot alignment, perfect streamer spacing, and no streamer feathering or drift. The navigation data would include the starting and ending locations of each sail line of the survey, the azimuth of the sail line and the sail line direction along that azimuth. The vessel configuration data would include the number of and length of streamers, the spacing between streamers, the spacing between receivers along the streamers, the distance between the vessel and the source center, and the distance between the source center and the first receivers.

At step 205, ray trace illumination modeling is applied to the seismic survey area, using the 3D earth model generated in step 203 and the idealized survey data generated in step 204. The ray trace illumination modeling is applied using idealized source and receiver locations in a data acquisition location. For example, in the case of marine seismic surveys, the source locations could be at the centers of the towed airgun arrays and the receiver locations could be at the centers of the hydrophone arrays in the towed streamers. The data acquisition location would be an area including the sail lines for the towed airgun arrays and the towed hydrophone arrays.

The ray trace illumination modeling generates idealized subsurface illumination for later comparison with the actual subsurface illumination. The idealized subsurface illumination generated may include, but is not restricted to, such measurable seismic characteristics as subsurface fold; offset distribution; minimum, maximum, and average reflection incidence angles; minimum and maximum offsets; and subsurface fold for near, mid, and far offset ranges. The idealized subsurface illumination can be presented for comparative analysis in any appropriate combination of idealized subsurface illumination displays.

Figure 3:
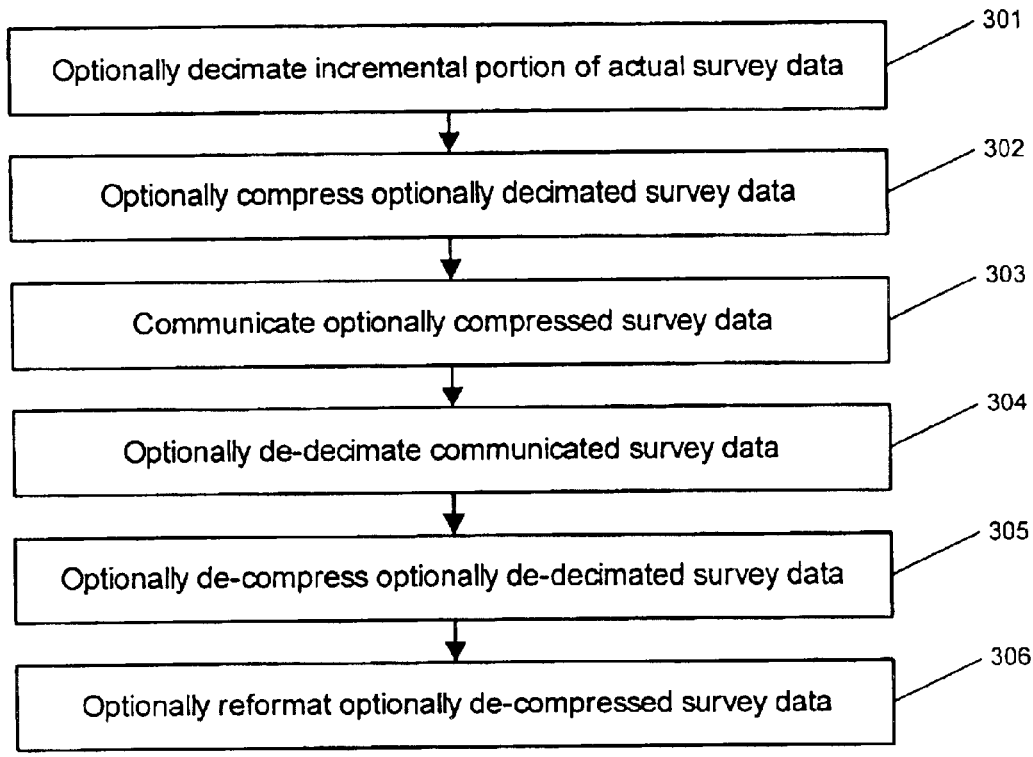
FIG. 3 is a flowchart describing further the step of communicating an incremental portion of actual survey data, from FIG. 1.

FIG. 3 is a flowchart describing further the step of communicating an incremental portion of actual survey data, as discussed above with reference to step 104 in FIG. 1.

At step 301, the incremental portion of actual survey data are optionally decimated, if necessary for communication in step 303, below. Note that if the optional compression in step 302 below is sufficient for the communication in step 303 below, then decimation may not be necessary.

At step 302, the optionally decimated survey data from step 301 are optionally compressed, if necessary for communication in step 303, below. Note that if the optional decimation in step 301 above is sufficient for the communication in step 303 below, then compression may not be necessary. Standard UNIX compression methods may achieve compression ratios of approximately 20:1. Commercially available software packages (for example, NAVCOM, which can be licensed from the company Øedegaard A/S) achieve data compression ratios in excess of 30:1. These compression ratios were found sufficient to transfer typical actual survey data via satellite communications link without decimation.

At step 303, the optionally compressed survey data from step 302 are communicated to the processing facilities that will analyze the data. The optionally compressed survey data are preferably communicated using satellite communications link or the Internet. In the marine seismic survey example, the general practice is to generate a unique P1-90 file for each sail line in the marine seismic survey to minimize the possibilities of transcription errors in processing. Transferring data files of this large size across a satellite-driven connection usually requires either data decimation or compression.

The optionally compressed survey data are preferably communicated in near real time, quickly enough that another cycle of infill acquisition may be analyzed, decided upon, communicated to the field, and begun while the survey equipment is still in the seismic survey area.

At step 304, the communicated survey data from step 303 may be optionally de-decimated, if optionally decimated in step 301, above. Typically, de-decimation is done through interpolation. However, interpolation is an approximation and the original data is not recovered. Thus, this step is not preferred.

At step 305, the optionally de-decimated survey data from step 304 are optionally de-compressed, if optionally compressed in step 302, above.

At step 306, the optionally de-compressed survey data from step 305 are optionally reformatted, if necessary, to a format compatible with the software being used for the ray trace illumination modeling in step 307 below. The intent of the optional reformatting is to substantially duplicate in the computer simulation the positions of the seismic sources and receivers observed in the field.

Figure 4:
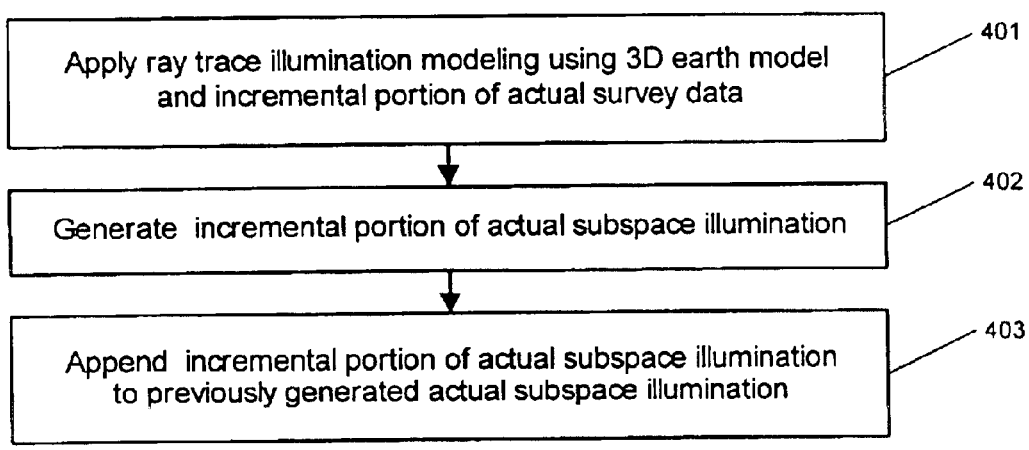
FIG. 4 is a flowchart describing further the step of generating an incremental portion of actual subsurface illumination, from FIG. 1.

FIG. 4 is a flowchart describing further the step of generating an incremental portion of actual subsurface illumination, as discussed above with reference to step 105 in FIG. 1.

At step 401, ray trace illumination modeling is applied using the 3D earth model generated in step 203 of FIG. 2 and the incremental portion of actual survey data collected in step 104 of FIG. 1, At step 402, an incremental portion only of actual subsurface illumination is generated from the ray trace illumination modeling of step 401. This incremental generation of actual subsurface illumination makes near real time monitoring of the seismic acquisition possible, since the generation can be done in the same amount of time as the next incremental portion of actual survey data is being collected in step 103 of FIG. 1. The actual subsurface illumination may be the same measurable seismic characteristics as generated for the idealized subsurface illumination and discussed in step 205 in FIG. 2. The actual subsurface illumination can be presented for comparative analysis in any appropriate combination of actual subsurface illumination displays.

At step 403, the incremental portion of actual subsurface illumination generated in step 402 is appended to the previously generated incremental portions of actual subsurface illumination. Thus, the actual subsurface illumination generated in the current cycle of incremental seismic acquisition is appended to the illumination results generated in all previous cycles of steps 102–105 of FIG. 1. The actual subsurface illumination is appended in a format suitable for display and analysis.

Figure 5:
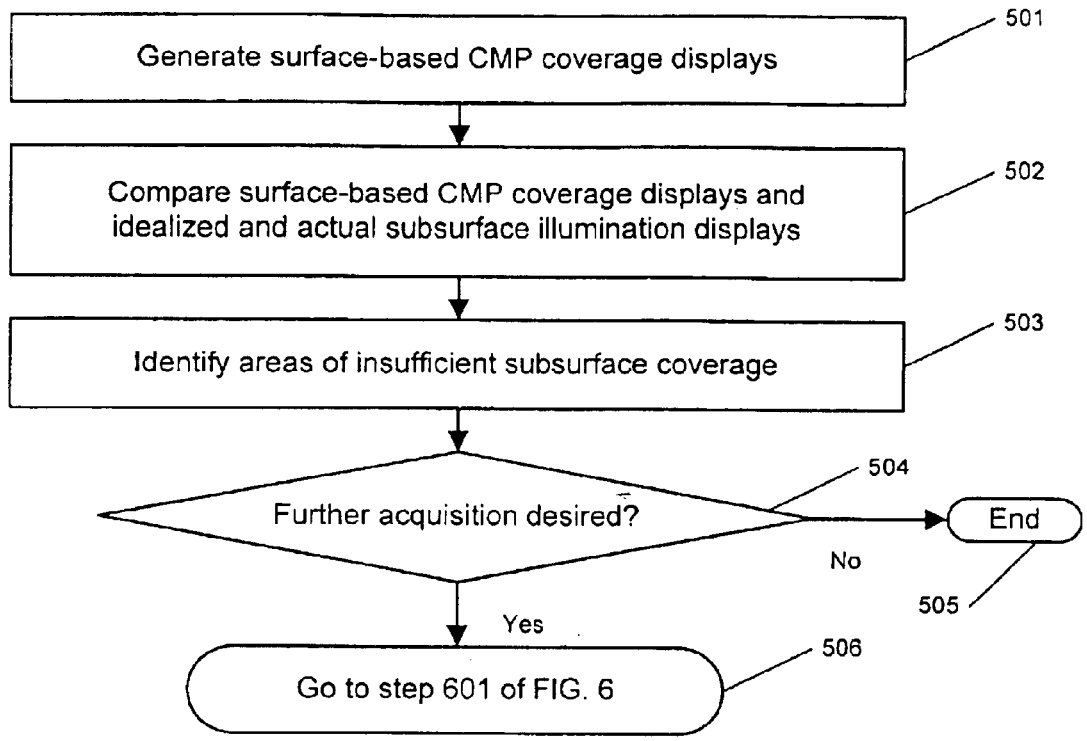
FIG. 5 is a flowchart describing further the step of determining if additional data acquisition is desirable.

FIG. 5 is a flowchart describing further the step of determining if additional data acquisition is desirable, as discussed above with reference to step 107 in FIG. 1.

At step 501, surface-based CMP coverage displays are generated for the seismic survey area of interest. These conventional CMP coverage displays are well known in the art of seismic processing.

At step 502, the CMP coverage displays generated in step 501, the idealized subsurface illumination generated by the ray trace illumination modeling in step 205 of FIG. 2, and the actual subsurface illumination generated by the ray trace illumination modeling in step 401 of FIG. 4 are compared. These comparisons can be visual, computational, analytical, or otherwise, and can include seismic processing, image processing, pattern recognition, image analysis, or any other method known in the art of seismic processing.

At step 503, areas of insufficient subsurface coverage are identified from the comparison of surface coverage and idealized and actual subsurface illumination in step 402.

At step 504, it is determined if further infill acquisition is desired, based upon whether areas of insufficient subsurface coverage are identified in step 503. If the answer is no, no further acquisition is desired, then the process proceeds to step 505 to end. If the answer is yes, further acquisition is desired, then the process continues to step 506.

Figure 6:
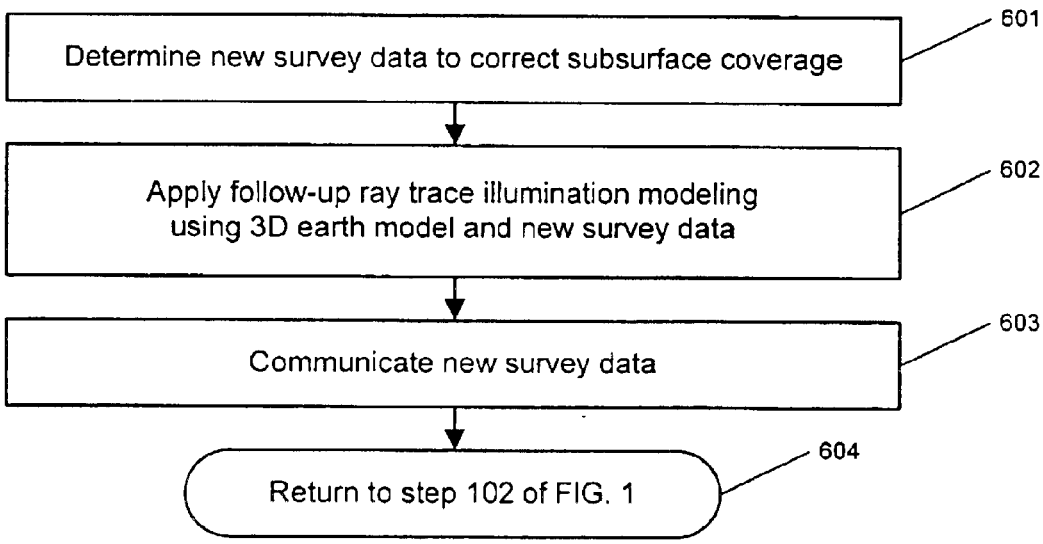
FIG. 6 is a flowchart describing further the step of performing any desirable additional data acquisition, from FIG. 1.

At step 506, the process continues to step 601 of FIG. 6.

FIG. 6 is a flowchart describing further the step of performing any desirable additional data acquisition, as discussed above with reference to step 108 in FIG. 1.

At step 601, new survey data are determined to correct the areas of insufficient subsurface coverage identified in step 503 of FIG. 5. The preferred method to determine the new survey data is targeted illumination analysis, described more fully described more fully below. Alternatively, the new survey data could be determined by reverse ray tracing or any method known in the art of seismic processing or modeling.

The preferred method of targeted illumination analysis is described in Campbell's U.S. patent application No. 10/155, 158, "Targeted Geophysical Survey", discussed above. The preferred method is a method for planning a seismic survey based on a model of a subsurface formation, comprising generating a computer simulation of a seismic survey having sources and receivers positioned in selected locations with respect to the model; performing ray tracing from the source locations to estimate propagation ray paths of seismic signals emanating from the source locations; determining locations of emergent points at which ray paths reach the earth's surface following reflection from a subsurface area of interest are concentrated; and designing a seismic survey in which receiver positions are concentrated at the locations where the emergent points are concentrated. Additionally, to improve the illumination of a subsurface target of interest, the preferred method further comprises utilizing a model of the subsurface to determine surface locations having a high concentration of emergent locations of seismic signals reflected from the subsurface target and positioning seismic receivers at the locations having a high concentration of emergent locations.

At step 602, ray trace illumination modeling is applied to the seismic survey area, using the 3D earth model generated in step 203 of FIG. 2 and the new survey data determined in step 601. The ray trace illumination modeling generates follow-up subsurface illumination corresponding to the idealized subsurface illumination and the actual subsurface illumination discussed in steps 101 and 105, respectively, of FIG. 1. The follow-up subsurface illumination can be presented for comparative analysis in any appropriate combination of follow-up subsurface illumination displays.

At step 603, the new survey data from step 601 are communicated to the field. The new survey data are preferably communicated in near real time, that is, quickly enough that the next cycle of infill acquisition may begin while the survey equipment and accompanying personnel are still in the seismic survey area At step 604, the returns to step 102 in FIG. 1, to select another sequence of time intervals during another cycle of the seismic survey and perform the infill seismic acquisition using the new survey data determined in step 601.

Thus, after any cycles of additional acquisition found necessary through the near real time comparison of idealized and actual illumination displays of illumination results and made effective through the near real time application of targeted illumination analysis, the seismic survey is completed. Infill acquisition is performed before the seismic equipment and accompanying personnel leave the seismic survey area because the infill acquisition analysis and determination is made and communicated in near real time.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for seismic acquisition, comprising
    generating idealized subsurface illumination using idealized survey data;
    performing the following during each of a sequence of time intervals during a seismic survey:
        collecting an incremental portion of actual survey data, using data acquisition equipment at a data acquisition location;
        communicating the incremental portion of actual survey data from the data acquisition location to a data processing location;
        generating an incremental portion of actual subsurface illumination using the incremental portions of actual survey data; and
        appending the incremental portion of actual subsurface illumination to previously generated portions of actual subsurface illumination from previous time intervals, to incrementally generate actual subsurface illumination at the data processing location;
    determining if additional data acquisition is desirable by comparison of the idealized subsurface illumination and the actual subsurface illumination, in the data processing location; and
    performing any desirable additional data acquisition before the data acquisition equipment leaves the data acquisition location.

2. The method of claim 1, wherein the step of generating idealized subsurface illumination comprises:
    generating a 3D earth model; and
    applying ray trace illumination modeling, using the 3D earth model and the idealized survey data.

3. The method of claim 2, wherein the step of generating a 3D earth model comprises:
    determining surface data;
    determining velocity data; and
    generating a 3D earth model using the surface data and the velocity data.

4. The method of claim 1, wherein the idealized survey data comprises idealized source and receiver locations for the seismic survey.

5. The method of claim 1, wherein the actual survey data comprises actual source and receiver locations from the seismic survey.

6. The method of claim 1, wherein the step of collecting incremental portions of actual survey data comprises:
    selecting a sequence of time intervals that span the seismic survey, and
    collecting the incremental portions of actual survey data during each of the time intervals in the sequence.

7. The method of claim 1, wherein the step of communicating an incremental portion of actual survey data uses a satellite communications link.

8. The method of claim 1, wherein the step of a communicating an incremental portion of actual survey data further comprises:
    compressing the incremental portion of actual survey data;
    communicating the compressed survey data; and
    de-compressing the communicated survey data.

9. The method of claim 1, wherein the step of a communicating an incremental portion of actual survey data further comprises:
    decimating the incremental portion of actual survey data;
    communicating the decimated survey data; and
    de-decimating the communicated survey data.

10. The method of claim 1, wherein the step of a communicating an incremental portion of actual survey data further comprises:
    reformatting the communicated survey data for ray trace illumination modeling.

11. The method of claim 1, wherein the step of generating an incremental portion of actual subsurface illumination comprises:
    applying ray trace illumination modeling using the 3D earth model and the incremental portion of actual survey data.

12. The method of claim 1, wherein the step of determining if additional data acquisition is desirable comprises:
    generating surface-based CMP coverage displays;
    comparing the surface-based CMP coverage displays, the idealized subsurface illumination, and the actual subsurface illumination; and
    identifying areas of insufficient subsurface coverage from the comparison.

13. The method of claim 12, wherein the step of performing any desirable additional data acquisition further comprises:
    applying ray trace illumination modeling using the 3D earth model and the idealized survey data, to generate new subsurface illumination.

14. The method of claim 1, wherein the step of performing any desirable additional data acquisition further comprises:
    applying targeted illumination analysis to the areas of insufficient subsurface coverage to generate new survey data.

15. The method of claim 14, wherein the step of performing any desirable additional data acquisition further comprises:
    communicating the new survey data to the data acquisition location; and
    performing infill seismic acquisition using the new survey data.

16. A method for illumination monitoring for near real time infill acquisition in a seismic survey, comprising:
    applying ray trace illumination modeling using idealized source and receiver locations in original source and receiver areas, respectively, in a data acquisition area to generate idealized subsurface illumination;
    collecting actual source and receiver locations during the seismic survey;
    applying ray trace illumination modeling in a data processing location, using the actual source and receiver locations to generate actual subsurface illumination;

determining insufficient subsurface coverage in near real time by comparison of the idealized subsurface illumination and the actual subsurface illumination;

determining new source and receiver areas in near real time that correct for the insufficient subsurface coverage; and repeating the above steps with the new source and receiver areas substituted for the original source and receiver areas, respectively.

17. A method for illumination monitoring for near real time infill acquisition in a seismic survey, comprising:

applying ray trace illumination modeling using idealized source and receiver locations in original source and receiver lines, respectively, to generate idealized subsurface illumination;

collecting incremental portions of actual source and receiver locations using data acquisition equipment in a data acquisition location, during the seismic survey, applying ray trace illumination modeling in a data processing location, using the incremental portions of actual source and receiver locations to generate incremental portions of actual subsurface illumination;

appending the incremental portions of actual subsurface illumination to previously processed actual subsurface illumination;

determining if additional data acquisition is desirable for correction of insufficient subsurface coverage by comparison of the idealized subsurface illumination and the actual subsurface illumination;

determining new source and receiver lines for desirable data acquisition that correct for the insufficient subsurface coverage; and performing the desirable data acquisition by repeating the above steps with the new source and receiver lines substituted for the original source and receiver lines, respectively, before the data acquisition equipment leaves the data acquisition area.

* * * * *